Patented July 12, 1932

1,867,034

UNITED STATES PATENT OFFICE

GEORGE H. STEVENS, OF NEWARK, NEW JERSEY

VULCANIZING RUBBER

No Drawing. Application filed October 24, 1927. Serial No. 228,486.

This invention relates to improvements in the use of organic nitrogenous bodies that assist in or accelerate the vulcanization of rubber, and has for its object the utilization of new products that are mentioned for this purpose.

In experimental work with various organic nitrogenous compounds that I have used to assist in the vulcanization of rubber, I have found that many derivatives of carbodiimide, or of aryl substituted carbobiimide form exceedingly valuable products for this purpose.

Carbodiimide is the hypothetical equivalent of cyanamide but of symmetrical form, but it exists as the symmetrical body in the form of many of its substituted derivatives and polymeric modifications.

In application Ser. No. 399,979 filed July 30, 1920, I have mentioned a solid solution accelerator comprising di-phenyl guanidine $C_{13}H_{13}N_3$ and modified tetra-phenyl melamine.

The di-phenyl guanidine contains 6 carbon atoms in each of the substituting phenyl groups as shown in the following symmetrical structural formula

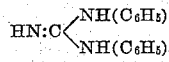

and is derived from either mono- or diphenyl substituted carbodiimide, and under heat disassociates again into both mono- and di- phenyl substituted carbodiimide.

I have also found that other derivatives of carbodiimide are also very efficient aids to vulcanization and especially where they are markedly basic in character.

In the original specification 399,979 as filed, I also disclosed the use of di-tolyl guanidine for use as an accelerator in rubber vulcanization, and set forth means for combining it into a solid solution with other nitrogenous bodies for lowering its melting point to make it still more effective for such use.

The di-tolyl guanidines contain 7 carbon atoms in each of the substituting tolyl groups or radicals, as shown by the following symmetrical structural formula

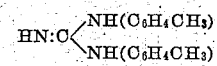

and they are derived from either a mono- or from a di-tolyl substituted carbodiimide. Commonly they are produced by uniting a carboditoylimide, with ammonia. They also form upon combining a carbomonotolylimide, known also as mono-tolyl cyanamide, with a toluidine. Di-tolyl guanidine usually exists as a mixture of isomers.

One method of obtaining mono- or di- aryl substituted carbodiimide is by desulphurizing the corresponding substituted thioureas.

Under the cyanogen chloride process of making di-phenyl guanidine, cyanogen chloride is reacted with aniline, forming a salt that upon being neutralized gives the base di-phenyl guanidine.

The tolyl and xylil di-substituted guanidines are formed in much the same manner. Practically the same reactions and results are found with the tolyl and xylil corresponding bodies respectively.

Carbodiimide, as well as the phenyl, tolyl, xylil and other aryl substitution products thereof, may some of them assume the form of polymeric modifications, by combining into polymolecular forms, or by combining with each other.

The phenyl, tolyl, and xylil substitution products of carbodiimide then, comprise the substituted guanidines containing any of these phenyl, tolyl, or xylil radicals, as well as the phenyl, tolyl and xylil substituted carbodiimides themselves and their numerous polymeric modifications, all of which are capable of taking part in cycle reactions that can be made applicable in the accelerating of rubber vulcanization.

These substituted guanidines, as well as their ammonia and primary phenyl amine components, are all active sulphur carriers. Their imide components however, are not so active in carrying sulphur.

When the amine and imide components are brought together however, they readily form the substituted guanidine addition products that are active sulphur carriers.

The phenyl radical is derived from aniline ($C_6H_5NH_2$), but does not occur in isomeric form.

The tolyl radical in all these compounds, is derived from toluidine ($C_6H_4CH_3NH_2$), wherein the methyl ($CH_3$), and amine ($NH_2$), substituting groups must be in either the 1:2, 1:3, or 1:4, positions as to one another, thus always giving an isomeric form to every tolyl radical.

The aryl substituted guanidines are derived from corresponding aryl substituted carbodi-imides, and then under heat they disassociate again into aryl substituted carbodiimides.

The presence of ammonia, or of substituted ammonia containing any of these aryl radicals, that are obtained from primary phenyl amines is usually sufficient to activate any of the imide forms and again make them active amine sulphur carriers, and disassociation then of the amine forms, returns them again to substituted carbodiimides, splitting off ammonia, or a primary phenyl amine, or both.

This unusual chemical activity, or cycle of acceleration reaction, is possible to a phenomenal extent with these substituted carbodiimide derivatives, and as the reactions are capable of considerable control, the products are in consequence of superior value in rubber vulcanization. Accelerators derived from di-aryl substituted carbodiimide are combined with the rubber and used in the conventional manner, of which the following example formula is an illustration:

100   lbs. smoked sheets (rubber).
3   lbs. sulphur.
10   lbs. zinc oxide.
12   ozs. of a solid solution of di-phenyl guanidine combined with di-tolyl guanidine.

113¾ lbs. of mix.

To be vulcanized at 40 lbs. steam pressure for 40 minutes.

The derivatives of di-substituted carbodiimide to be utilized as accelerators in rubber vulcanization that are particularly embraced by this specification, are those combinations di-substituted guanidine accelerators that are combined into a solid solution having a modified or common melting point so that they will co-act, and which are derived from both di-phenyl substituted carbodiimide and di-tolyl substituted carbodiimide, or from their isomers, polymers, or higher homologues, respectively and ammonia, or a solid solution accelerator of two such di-substituted guanidines as may result from desulphurizing di-substituted thioureas in the presence of ammonia, as disclosed in the claims 7 and 4 of Patents 1,559,196 and 1,559,198 respectively, and in Ser. No. 59,726 filed Sept. 30, 1925, and which are derived from corresponding di-substituted carbodiimide.

All of the foregoing di-substituted guanidines are valuable accelerators in view of the fact that ammonia, the primary phenyl amines which are mono-substituted ammonia, cyanamide, and guanidine which is the addition product of cyanamide and ammonia, have long been known to be accelerators.

Any guanidine nucleus then, containing radicals or groups that are derived from primary phenyl amines must be accelerators, whether they be so from the combination or not, because in their disassociation under heat, whether the same take place outside of, or within a vulcanization, they split off either primary phenyl amines, or ammonia, or both again, that in themselves are accelerators.

My invention then consists in utilizing, in rubber vulcanization, the two modified di-substituted guanidines herein mentioned, and when so used in the form of a solid solution, they appear to have superior qualities to many of the compounding ingredients used heretofore in compounding and vulcanizing rubber.

Having now described my invention, and having shown in what manner the same may be utilized, what I claim as new, and desire to secure by Letters Patent is:

1. A process of vulcanizing rubber which consists in, modifying the melting point or nitrogen content of di-tolyl guanidine by incorporating di-phenyl guanidine with it into a solid solution as a modified symmetrical di-substituted guanidine accelerator, then incorporating the accelerator thus formed into compounded rubber, and then heating the resultant rubber mixture with a vulcanizing agent to effect vulcanization.

2. A vulcanized compound derived from compounded rubber or similar material combined with a vulcanizing agent, and a solid solution of symmetrical di-tolyl guanidine, and symmetrical di-phenyl guanidine.

GEORGE H. STEVENS.